United States Patent
Spruce

(10) Patent No.: US 10,578,080 B2
(45) Date of Patent: Mar. 3, 2020

(54) INITIALISATION OF WIND TURBINE CONTROL FUNCTIONS

(71) Applicant: VESTAS WIND SYSTEMS A/S, Aarhus N (DK)

(72) Inventor: Chris Spruce, Leatherhead (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 19 days.

(21) Appl. No.: 15/736,086

(22) PCT Filed: Jun. 22, 2016

(86) PCT No.: PCT/DK2016/050210
§ 371 (c)(1),
(2) Date: Dec. 13, 2017

(87) PCT Pub. No.: WO2017/000954
PCT Pub. Date: Jan. 5, 2017

(65) Prior Publication Data
US 2018/0180024 A1   Jun. 28, 2018

(30) Foreign Application Priority Data
Jun. 30, 2015   (DK) .............................. 2015 70412

(51) Int. Cl.
*F03D 7/02*   (2006.01)
*F03D 7/04*   (2006.01)
(Continued)

(52) U.S. Cl.
CPC ........... *F03D 7/0292* (2013.01); *F03D 7/048* (2013.01); *F03D 17/00* (2016.05); *G05B 15/02* (2013.01);
(Continued)

(58) Field of Classification Search
None
See application file for complete search history.

(56) References Cited

U.S. PATENT DOCUMENTS

| | | |
|---|---|---|
| 5,130,003 A | 7/1992 | Conrad |
| 2010/0298995 A1 | 11/2010 | Zhang et al. |

(Continued)

FOREIGN PATENT DOCUMENTS

| | | |
|---|---|---|
| CN | 1880756 A | 12/2006 |
| CN | 101900079 A | 12/2010 |

(Continued)

OTHER PUBLICATIONS

State Intellectual Property Office (SIPO) of The People's Republic of China Notification of the First Office Action for Application No. 201680038987.3 dated Feb. 3, 2018.

(Continued)

*Primary Examiner* — Ryan A Jarrett
(74) *Attorney, Agent, or Firm* — Patterson + Sheridan, LLP

(57) ABSTRACT

A method for controlling a wind turbine is provided. The wind turbine is a turbine of the type that is operated to perform a control function that controls the amount of power produced based upon measures of fatigue life consumption of one or more turbine components. The method comprises initialising the control function by: over-riding or bypassing (405) the control function for a predetermined period of time, such that power produced by the wind turbine is not altered based upon the determined measures of fatigue life consumption; during the predetermined period of time, operating (407) one or more fatigue lifetime usage estimation algorithms, to determine a measure of the fatigue life consumed by each of the one or more turbine components; and after the predetermined period of time has elapsed, activating (409) the control function and using, in the control (Continued)

function, at least one of the measures of fatigue life consumption determined during the predetermined period of time. A corresponding wind turbine controller and wind power plant controller are also provided.

22 Claims, 5 Drawing Sheets

(51) Int. Cl.
  *F03D 17/00* (2016.01)
  *G05B 15/02* (2006.01)
  *F03D 9/25* (2016.01)
(52) U.S. Cl.
  CPC ...... *F03D 9/257* (2017.02); *F05B 2270/1075* (2013.01); *F05B 2270/332* (2013.01)

(56) References Cited

U.S. PATENT DOCUMENTS

| 2011/0018271 | A1 | 1/2011 | Karikomi et al. |
| 2013/0320674 | A1 | 12/2013 | Ingram |
| 2014/0030089 | A1 | 1/2014 | Wickstrom |
| 2014/0248123 | A1* | 9/2014 | Turner ................ F03D 7/0292 415/1 |

FOREIGN PATENT DOCUMENTS

| CN | 103946540 A | 7/2014 |
| EP | 2853730 A1 | 4/2015 |
| EP | 2868918 A1 | 5/2015 |
| WO | 2013044925 A1 | 4/2013 |
| WO | 2017000954 A1 | 1/2017 |

OTHER PUBLICATIONS

Danish Patent & Trademark Office Search Report for Application No. PA 2015 70412 dated Apr. 4, 2016.
PCT International Search Report for Application No. PCT/DK2016/050210 dated Jun. 22, 2016.
PCT Written Opinion of the International Searching Authority for Application No. PCT/DK2016/050210 dated Jun. 6, 2016.
Chinese Office Action for Application No. 201680038987.3 dated Dec. 3, 2018.

* cited by examiner

INITIALISATION OF WIND TURBINE CONTROL FUNCTIONS

Embodiments of the present invention relate to methods and control systems for initialising control functions that protect a wind turbine from excessive wear of components.

FIG. 1A illustrates a large conventional wind turbine 1, as known in the art, comprising a tower 10 and a wind turbine nacelle 20 positioned on top of the tower 10. The wind turbine rotor 30 comprises three wind turbine blades 32 each having a length L. The wind turbine rotor 30 could comprise another number of blades 32, such as one, two, four, five, or more. The blades 32 are mounted on a hub 34 which is located at a height H above the base of the tower. The hub 34 is connected to the nacelle 20 through a low speed shaft (not shown) extending from the front of the nacelle 20. The low speed shaft drives a gearbox (not shown) which steps up the rotational speed and, in turn, drives an electrical generator within the nacelle 20 for converting the energy extracted from the wind by the rotating blades 32 into electrical power output. The wind turbine blades 32 define a swept area A, which is the area of a circle delineated by the rotating blades 32. The swept area dictates how much of a given air mass is intercepted by the wind turbine 1 and, thus, influences the power output of the wind turbine 1 and the forces and bending moments experienced by the components of the turbine 1 during operation. The turbine may stand onshore, as illustrated, or offshore. In the latter case the tower will be connected to a monopile, tripod, lattice or other foundation structure, and the foundation could be either fixed or floating.

Each wind turbine has a wind turbine controller, which may be located at the tower base or tower top, for example. The wind turbine controller processes inputs from sensors and other control systems and generates output signals for actuators such as pitch actuators, generator torque controller, generator contactors, switches for activating shaft brakes, yaw motors etc.

FIG. 1B shows, schematically, an example of a conventional wind power plant 100 comprising a plurality of wind turbines 110, the controller of each of which communicates with a power plant controller (PPC) 130. The PPC 130 can communicate bi-directionally with each turbine. The turbines output power to a grid connection point 140 as illustrated by the thick line 150. In operation, and assuming that wind conditions permit, each of the wind turbines 110 will output maximum active power up to their rated power as specified by the manufacturer.

FIG. 2 illustrates a conventional power curve 55 of a wind turbine plotting wind speed on the x axis against power output on the y axis. Curve 55 is the normal power curve for the wind turbine and defines the power output by the wind turbine generator as a function of wind speed. As is well known in the art, the wind turbine starts to generate power at a cut-in wind speed $V_{min}$. The turbine then operates under part load (also known as partial load) conditions until the rated wind speed is reached at point $V_R$. At the rated wind speed the rated (or nominal) generator power is reached and the turbine is operating under full load. The cut-in wind speed in a typical wind turbine may be 3 m/s and the rated wind speed may be 12 m/s, for example. Point $V_{max}$ is the cut-out wind speed which is the highest wind speed at which the wind turbine may be operated while delivering power. At wind speeds equal to, and above, the cut-out wind speed the wind turbine is shut down for safety reasons, in particular to reduce the loads acting on the wind turbine. Alternatively the power output may be ramped down as a function of windspeed to zero power.

The rated power of a wind turbine is defined in IEC 61400 as the maximum continuous electrical power output that a wind turbine is designed to achieve under normal operating and external conditions. Large commercial wind turbines are generally designed for a lifetime of 20 to 25 years and are designed to operate at the rated power so that the design loads and fatigue life of components are not exceeded.

The fatigue damage accumulation rates of individual components in wind turbines vary substantially under different operating conditions. The rate of wear, or accumulation of damage, tends to increase as generated power increases. Wind conditions also affect rate of accumulation of damage. For some mechanical components, operation in very high turbulence causes a rate of accumulation of fatigue damage that is many times higher than in normal turbulence. For some electrical components, operation at very high temperatures, which may be caused by high ambient temperatures, causes a rate of accumulation of fatigue damage, such as insulation breakdown rate, that is many times higher than in normal temperatures. As an example, a rule of thumb for generator windings is that a 10° C. decrease in winding temperature increases lifetime by 100%.

Recently progress has been made in controlling turbines such that they can produce more power than the rated power as indicated by shaded area 58 of FIG. 2. The term "over-rating" is understood to mean producing more than the rated active power during full load operation by controlling one or more turbine parameters such as rotor speed, torque or generator current. An increase in speed demand, torque demand and/or generator current demand increases additional power produced by over-rating, whereas a decrease in speed, torque and/or generator current demand decreases additional power produced by over-rating. As will be understood, over-rating applies to active power, and not reactive power. When the turbine is over-rated, the turbine is run more aggressively than normal, and the generator has a power output which is higher than the rated power for a given wind speed. The over-rating power level may be up to 30% above the rated power output, for example. This allows for greater power extraction when this is advantageous to the operator, particularly when external conditions such as wind speed, turbulence and electricity prices would allow more profitable power generation.

Over-rating causes higher wear or fatigue on components of the wind turbine, which may result in early failure of one or more components and require shut down of the turbine for maintenance. As such, over-rating is characterised by a transient behaviour. When a turbine is over-rated it may be for as short as a few seconds, or for an extended period of time if the wind conditions and the fatigue life of the components are favourable to over-rating.

Existing control techniques tend to focus on responding directly to measurements of turbine conditions. U.S. Pat. No. 6,850,821 discloses a wind turbine controller that uses measured stress conditions as an input allowing control of the output power as a function of measured stress. Thus, for example, power output may be reduced in very turbulent wind conditions in comparison to less turbulent conditions having the same average wind speed. US-A-2006/0273595 discloses intermittently operating a wind power plant at an increased rated power output based on an assessment of operating parameters with respect to component design ratings and intermittently increasing the output power of a wind turbine based on the assessment. EP-1,911,968 describes a wind turbine control system in which a turbine is operated within rated power levels using feedback from a continuous-time damage model that calculates the rate at which damage is accumulated at any time.

Lifetime Usage Estimators may be used in ensuring the fatigue load limits of all turbine components remain within their design lifetimes. The loads a given component experiences (be they bending moments, temperatures, forces or motions for example) may be measured and the amount of component fatigue life consumed calculated, for example using a technique such as a rainflow count and Miner's rule or a chemical decay equation. Based on Lifetime Usage Estimators, individual turbines can then be operated in such a way as to not exceed their design limits. A device, module, software component or logical component for the measuring of the fatigue life consumed for a given turbine component may also be referred to as its Lifetime Usage Estimator, and the same acronym (LUE) will be used to refer to the algorithm for determining a lifetime usage estimate and the corresponding device, module or software or logic component.

Lifetime usage estimators provide a useful indication of the amount of wear experienced by a given component. However, it has been appreciated that simply using LUEs in wind turbine control applications, whereby turbine power output is controlled based on lifetime usage estimates, is sub-optimal, particularly because such control only takes into account expected rate of damage accumulation over the entire lifetime of the turbine.

A particular method of controlling a wind turbine in response to damage incurred in turbine components is described in WO 2013/044925. A controller for a wind turbine includes a turbine optimiser and a lifetime usage estimator. The turbine optimiser outputs set-points for operating parameters of the wind turbine based on a power demand input and an input from the lifetime usage estimator. The lifetime usage estimator calculates a measure of the fatigue life consumed by each of a plurality of turbine components based on a lifetime usage algorithm for each component, the lifetime usage algorithms operating on values of variables affecting the fatigue lifetime of the components, the values being obtained from sensors on the wind turbine. The lifetime usage calculations can be implemented on a turbine that has already been in service by using historical data, and appropriate calculations, to determine estimates of initial values for the lifetime usage estimators.

The present invention aims to provide improved methods and apparatus for controlling wind turbines to provide additional protection against premature ageing and fatigue-damage accumulation when using LUEs.

SUMMARY OF THE INVENTION

The invention is defined in the independent claims to which reference is now directed. Preferred features are set out in the dependent claims.

Embodiments of the invention generally relate to the use of Lifetime Usage Estimators (LUEs) in various control scenarios. By definition, LUEs are looking at periods over an entire turbine lifetime, typically 20 to 25 years. Changes in rate of accumulation of fatigue damage are relatively small from year-to-year, but normally have large variations from month to month or season to season. It has been appreciated that, when LUEs are used in turbine control functions, the control performance may be substantially suboptimal if LUEs are used immediately after commissioning the control function, with no initialisation. For example, if used for over-rating control, and the over-rating control is commissioned in the middle of a northern hemisphere Winter, high wind conditions will suppress all over-rating for close to three seasons. The financial value of generation in the early years of a project is disproportionally high, and therefore it is valuable to have an intelligent control strategy that allows for the earliest possible use of over-rating, or other LUE based turbine control, that avoids unnecessarily restricting power generation.

According to a first aspect of the invention there is provided a method of controlling a wind turbine. The wind turbine is configured to be operated to perform a control function that controls the amount of power produced by the turbine based upon measures of fatigue life consumption of one or more turbine components. The method comprises initialising the control function by: over-riding or bypassing the control function for a predetermined period of time, such that power produced by the wind turbine is not altered based upon the determined measures of fatigue life consumption; during the predetermined period of time, operating one or more fatigue lifetime usage estimation algorithms to determine a measure of the fatigue life consumed by each of the one or more turbine components; and after the predetermined period of time has elapsed, activating the control function and using, in the control function, at least one of the measures of fatigue life consumption determined during the predetermined period of time.

Controlling a wind turbine according to this method has the advantage that the control function is unable to suppress power generation when it is over-ridden or bypassed, but the measure of fatigue life consumed continues to be monitored. As such, the control function can then be activated after high wind seasons, during which it would suppress power generation, and when the over-ride period has passed an accurate measure of fatigue life is available for use with the control function. A control function can therefore be provided earlier, and over-ridden until a time at which it would not unduly reduce power output.

During normal operation, when it is not over-ridden, the control function may control the amount of power produced based upon measures of fatigue life consumption by: obtaining from turbine sensors one or more signals, or values of variables, that indicate the fatigue lifetime of one or more components of the turbine; applying a fatigue lifetime usage estimator algorithm to the signals or values to determine a measure of the fatigue life consumed by each of a plurality of turbine components; and controlling operating parameters of the wind turbine based upon the measures of fatigue life consumption to alter the power produced by the wind turbine.

Optionally, the control function controls the power level to which the wind turbine is over-rated. This prevents the over-rating control function from cancelling over-rating or entering a de-rated mode, and allows additional energy to be captured by the turbine. Optionally, the control function compares the proportion of the fatigue life consumed by the components with a target consumption based on the age of the component and prevents over-rating, or reduces the power level to which the wind turbine is over-rated, if the fatigue life consumed by any component is greater than the target consumption for that component. Alternatively, the control function compares the proportion of the fatigue life consumed by the most damaged component with a target consumption based on the age of that component and prevents over-rating, or reduces the power level to which the wind turbine is over-rated if the fatigue life consumed is greater than the target consumption for that component.

Optionally, the measures of fatigue life consumption are rates of consumption of fatigue life. The control function may apply a predetermined function, to one or more of the rates of consumption of fatigue life, that controls the over-rating amount in proportion to the rate of consumption of fatigue life for each of the one or more turbine components.

Optionally, during the predetermined period of time, the output power level from the over-ridden control function is set equal to a predetermined over-rating power level, such as maximum over-rating. This ensures that additional power can be captured by over-rating the turbine when the control function might otherwise reduce over-rated power output.

Optionally the predetermined period of time extends through at least a portion of a seasonal period during which accumulated fatigue damage, or the rate of accumulation of fatigue damage, historically exceeds a target value for a given component. The over-ride period can therefore be targeted to specific times of year that are particularly hard on component wear, and would therefore result in reduced over-rating for control functions that limit over-rating based on fatigue damage accumulation rate.

Optionally the method may further comprise receiving an input indicative of the time of year at which the control function is being initialised; determining whether the time of year of initialisation of the control function falls within a predetermined seasonal period of the year that includes a seasonal period during which accumulated fatigue damage, or the rate of accumulation of fatigue damage, historically exceeds a target consumption; and setting the predetermined period of time, during which the control function is over-ridden, based upon the determination. This allows the specific times of year that are particularly hard on component wear, and would therefore result in reduced over-rating for control functions that limit over-rating based on fatigue damage accumulation rate, to be automatically bypassed so that the control function is activated at a time when it would not unduly reduce turbine power output. The method of initialisation of the control function is optionally performed only when the time of year of initialisation is within the predetermined seasonal period of the year. The predetermined period of time during which the control function is over-ridden is optionally set as the difference between the time of year of initialisation and the end of the predetermined seasonal period of the year.

The predetermined period of time, during which the control function is over-ridden, is optionally between one month and three years from initialising the control function. In particular, the period of time, during which the control function is over-ridden, may be between two months and one year from initialising the control function. Even more particularly, the period of time during which the control function is over-ridden may be six months, or thereabouts, from initialising the control function.

According to a second aspect there is provided a controller for a wind turbine, the controller being configured to: perform a control function to control the amount of power produced based upon measures of fatigue life consumption of one or more turbine components; and initialise the control function by: over-riding the control function for a predetermined period of time, such that power produced by the wind turbine is not altered based upon the determined measures of fatigue life consumption; during the predetermined period of time, operating one or more fatigue lifetime usage estimation algorithms to determine a measure of the fatigue life consumed by each of the one or more turbine components; and after the predetermined period of time has elapsed, activating the control function and using, in the control function, at least one of the measures of fatigue life consumption determined during the predetermined period of time.

The control function may be implemented in the wind turbine controller or in a corresponding wind power plant controller. The initialisation method may also be implemented in software within the wind turbine controller or a corresponding wind power plant controller.

According to a third aspect, therefore, there is provided a controller for a wind power plant, the controller being configured to, for each of a plurality of wind turbines: perform a control function to control the amount of power produced based upon measures of fatigue life consumption of one or more turbine components of the turbine; and initialise the control function by: over-riding the control function for a predetermined period of time, such that power produced by the wind turbine is not altered based upon the determined measures of fatigue life consumption; during the predetermined period of time, operating one or more fatigue lifetime usage estimation algorithms to determine a measure of the fatigue life consumed by each of the one or more turbine components of the turbine; and after the predetermined period of time has elapsed, activating the control function and using, in the control function, at least one of the measures of fatigue life consumption determined during the predetermined period of time.

According to a fourth aspect there is provided a corresponding computer program that when executed on a wind turbine controller or wind power plant controller causes it to carry out any of the methods described herein.

BRIEF DESCRIPTION OF THE DRAWINGS

The invention will now be further described by way of example only and with reference to the accompanying figures in which.

DETAILED DESCRIPTION OF PREFERRED EMBODIMENTS

Embodiments of the invention will be described that make use of Lifetime Usage Estimators (LUEs) in various control scenarios. This includes the use of Lifetime Usage Estimators in: over-rating control; non-over-rating controls, e.g. de-rating to avoid actual turbine life being less than design life; and functions which do not involve closed-loop control, e.g. maintenance scheduling. In particular, embodiments relate to the initialisation of control functions that use LUEs.

Figure 1A:
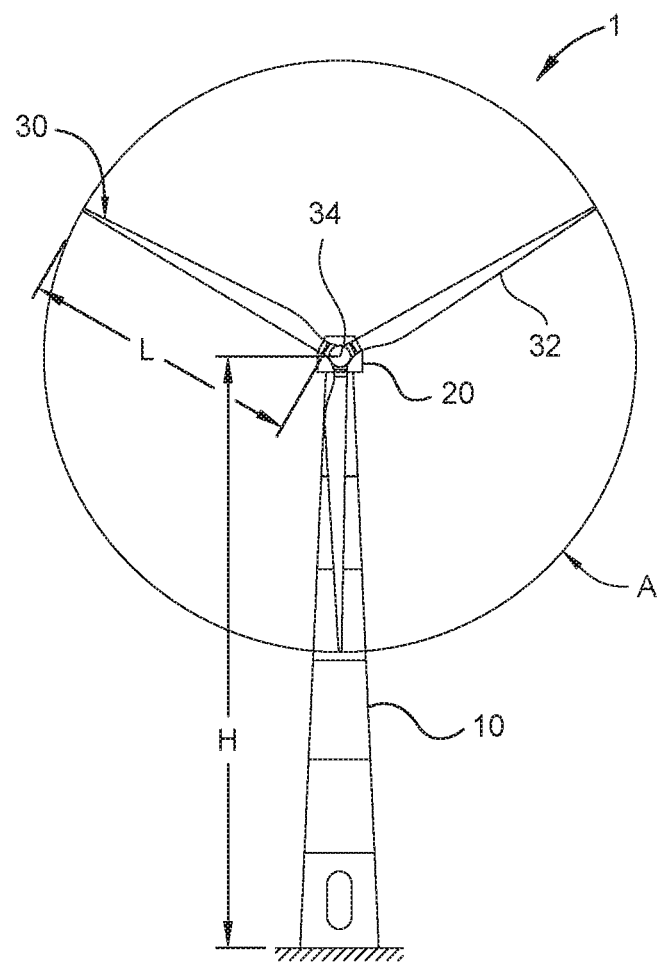
FIG. 1A is a schematic front view of a conventional wind turbine.
Figure 1B:
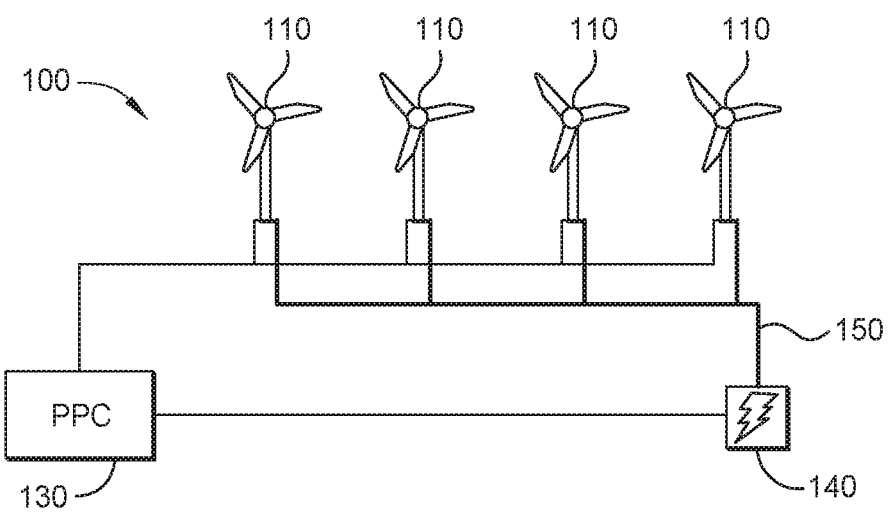
FIG. 1B is a schematic representation of a conventional wind power plant comprising a plurality of wind turbines.
Figure 2:
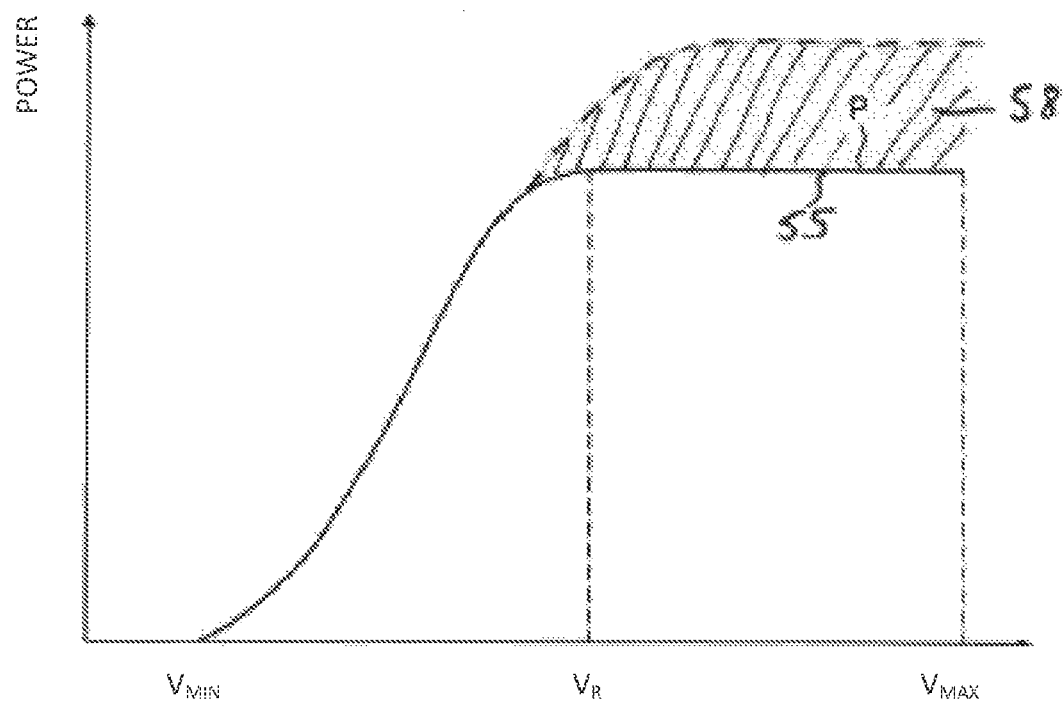
FIG. 2 is a graph illustrating a conventional power curve of a wind turbine.
Figure 3:
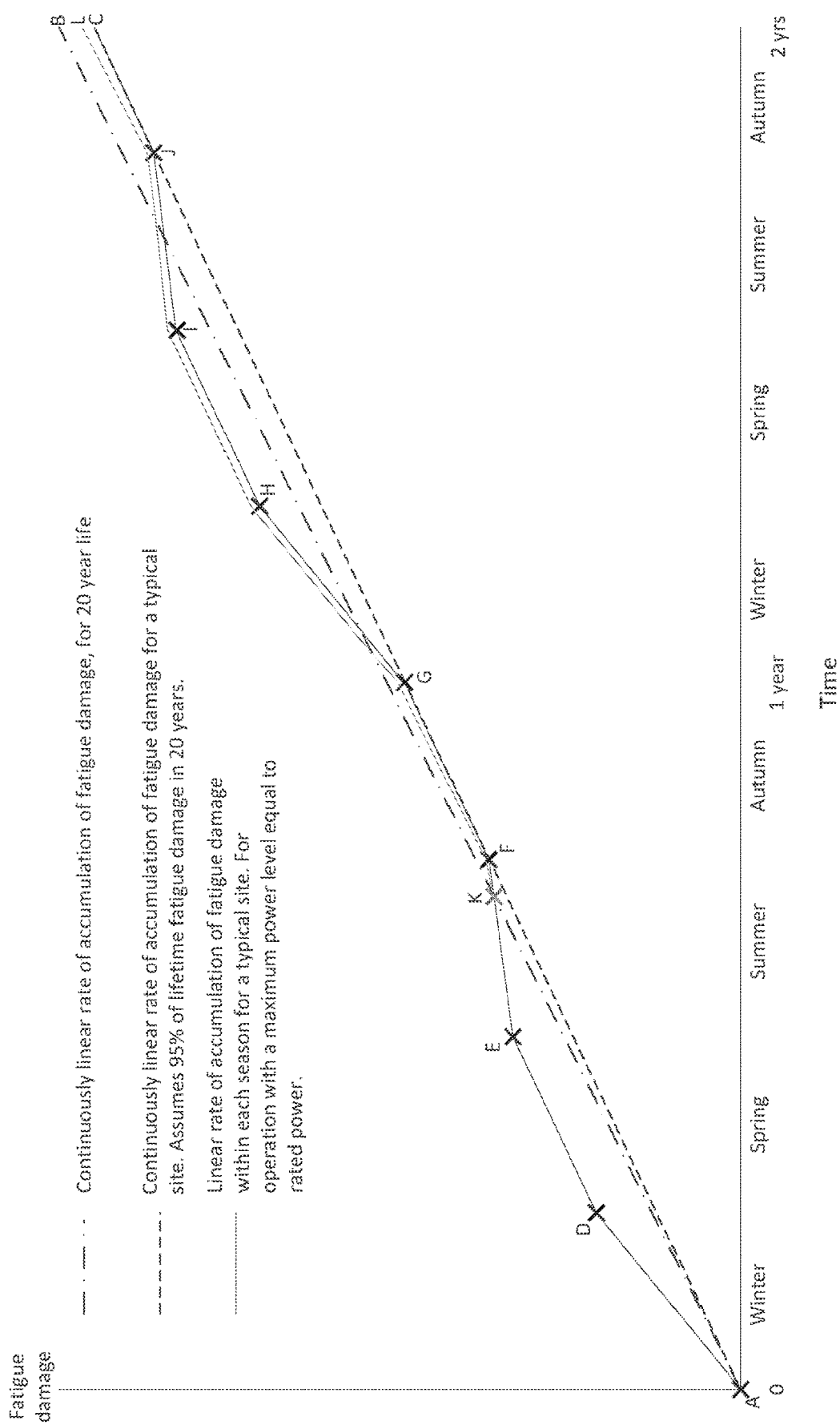
FIG. 3 is a graph illustrating fatigue damage incurred by an example turbine component over a period of two years with and without over-rating control.

FIG. 3 shows an example of the fatigue damage that can be incurred by an example wind turbine component over a period of two years. The line from point A to point B defined by alternating dots and dashes represents the continuously linear rate of accumulation of fatigue damage, over a 20 to 25 year life span. This line indicates fatigue damage accumulating at a linear rate and at the design rate, i.e. 100% of the fatigue life will have been used when the turbine lifetime has been reached. The line from point A to point C, defined by evenly spaced dashes, represents an example of the continuously linear rate of accumulation of fatigue damage for a typical wind turbine power plant site, in which 95% of lifetime fatigue damage occurs over a 20 to 25 year life span. This line indicates fatigue accumulating at a more realistic rate for a real site, giving 95% utilisation of fatigue life over the turbine lifetime.

It should be noted that FIG. 3 is a schematic for illustrative purposes, in particular the y-axis is shown as "Fatigue damage", whereas in practice this might be "maximum fatigue damage in a component", and the component with the maximum fatigue damage might vary as time passes. However this would not materially affect the shape of the graphs.

An example of the accumulation of fatigue damage over two typical years, for a wind power plant in the northern hemisphere, is shown by the continuous line running through points A-D-E-F-G-H-I-J-C. This line represents normal operation on a typical site, i.e. operation at a maximum power level equal to rated power. This plot is for the case in which operation commences at the start of a Winter period. As can be seen, a greater amount of fatigue damage is incurred during seasons having higher average wind speeds, particularly during Winter. Rate of accumulation of fatigue damage may be higher than the expected linear 20 to 25 year rate during Winter, lower in Summer, and approximately equal during Spring and Autumn. In the example of FIG. 3 the long-term design life trend is exceeded initially, during A-D-E-K, because the first season of operation is Winter. This is not a problem however because after one year of operation, point G, the fatigue damage is 95% of the design value.

The turbine controller of WO 2013/044925 describes a turbine optimiser that compares the proportion of the fatigue life consumed by the components with a target consumption based on the age of the component, and prevents over-rating of the turbine if the fatigue life consumed by any component is greater than the target consumption for that component. In another example the turbine optimiser compares the proportion of the fatigue life consumed by the most damaged components with a target consumption based on the age of that component and prevents over-rating of the turbine if the fatigue life consumed is greater than the target consumption for that component. These are examples of a control function in which power output of the turbine is controlled using a power level signal that depends upon the fatigue life consumed by components of the turbine. Such control functions, whether they are implemented at the wind turbine controller, at the power plant controller, or at any other location, may be used in any embodiments of the invention.

A wind turbine controller that alters power output, such as over-rated power output, based on a measure of fatigue life consumption may assume a continuously linear accumulation of fatigue damage over the 20 to 25 year lifetime, for example. The fatigue damage curve that will be followed for such an over-rating control strategy is also shown in FIG. 3. This follows line A-D-E-F initially, but then diverges at point K and follows the line marked "L", which can be seen as having fatigue damage values just above the F-G-H-I-J-C line. This controller targets a linear rate of accumulation of fatigue damage over 20 to 25 years. As a result it does not over-rate the wind turbine until point K, thereby illustrating the disadvantage of simply targeting a linear rate of accumulation of fatigue damage over the lifetime.

After point K, the portions where the line "L" is below line A-B (the line of alternating dots and dashes) indicate periods in which over-rating takes place, and the portions above line A-B illustrate when over-rating does not take place. It is assumed in FIG. 3 that the over-rating gives a rate of accumulation of fatigue damage, during winds of above rated wind-speed, that is approximately 15% higher than in normal operation. Note that over-rating only takes place for about 20-35% of the total time on most sites. It can be seen that across the first 2 years of operation, relatively little over-rating takes place, and very little takes place in the Winter months, because this would lead to fatigue damage above the linear fatigue damage model. However, periods of above average fatigue damage may be offset by periods of below average fatigue damage, allowing the turbine components to ultimately stay within the design envelope. This represents a lost opportunity for additional power production that may be particularly important to the turbine operator during the initial operation phase of a wind power plant. A controller according to an embodiment of the invention may therefore implement an initialisation process.

The design envelope consists of the range of operating parameters within which the turbine is designed to operate (operational design envelope) or survive (survival design envelope). For example, the operational design envelope for the operating parameter gearbox oil temperature may be 10° C. to 65° C., that is, if the gearbox oil temperature moves outside this range then then turbine will be outside its operational design envelope. In this case, the turbine is protected by alarms (referred to in IEC 61400-1 as 'protection functions') and will shut down if the gearbox oil temperature moves outside this range. As well as being defined by real-time operating limits, such as temperatures and electrical current limitations, the operational design envelope may also, or alternatively, be defined by the loads, including fatigue loads, used to design the mechanical components and parts of the electrical components; i.e. the "design loads".

Over-rating exploits the gap that typically exists between the component design loads and the loads experienced by each turbine in operation, which is typically more benign than the IEC-standard simulated conditions for which the design loads were calculated. Over-rating causes the power demand for the turbine to be increased in high winds until either an operating limit specified by an operational constraint (temperature, etc.) is reached, or until an upper power limit is reached that has been set to prevent component design loads from being exceeded. Operational constraints limit the possible over-rating set point signal as a function of various operating parameters. For example, where a protection function is in place to initiate shut down when the gearbox oil temperature exceeds 65° C. as mentioned above, an operational constraint may dictate a linear decrease in the maximum possible over-rating set point signal as a function of gearbox oil temperature for temperatures over 60° C., reaching "no over-rating possible" (i.e., a power set-point signal equal to rated power) at 65° C.

Figure 4:
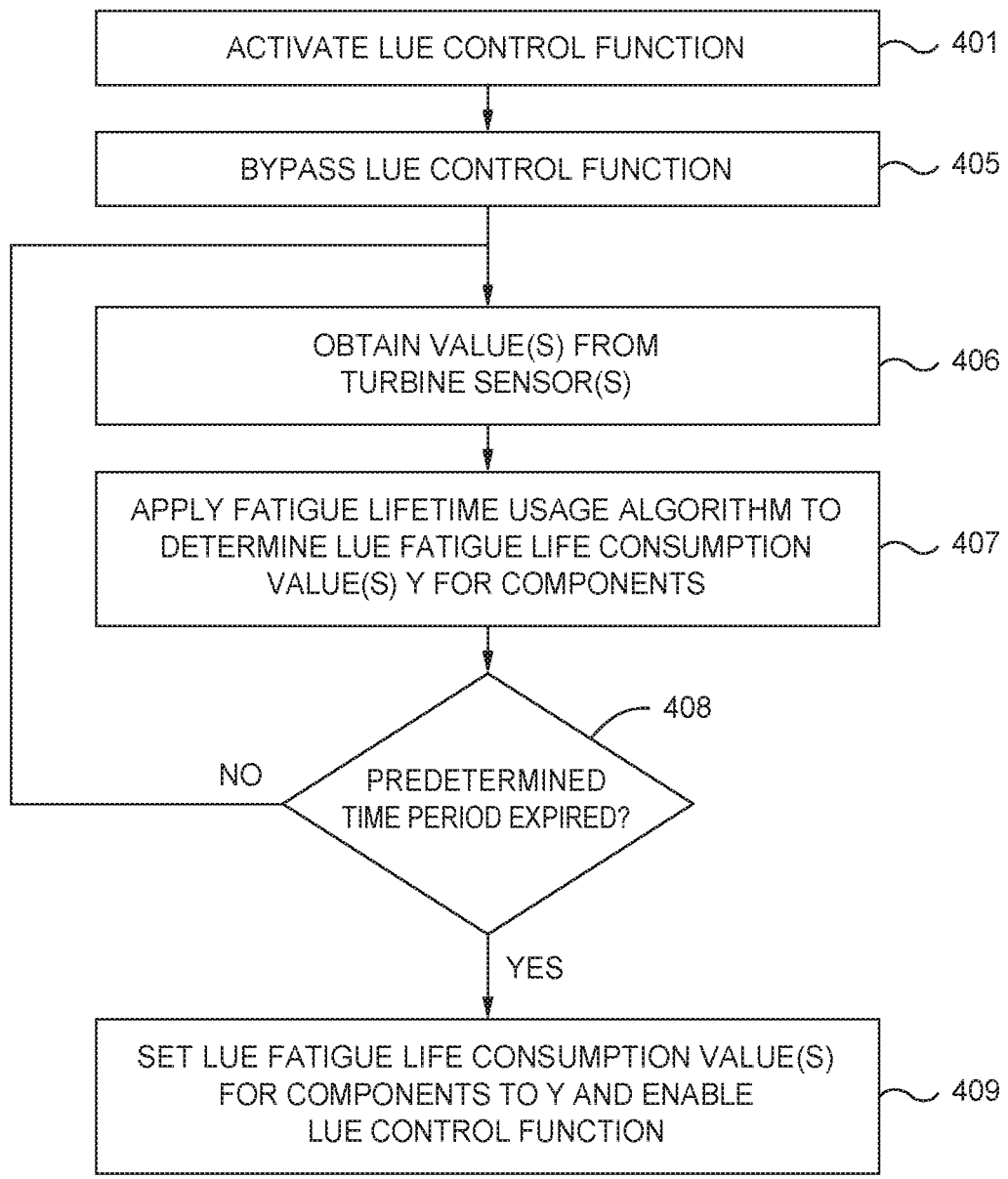
FIG. 4 is an example of a method employed in a turbine controller to initialise an LUE based control function according to an embodiment of the invention.

FIG. 4 shows an example of a method employed in a turbine controller to initialise an LUE based control function. Initially, the control function is not activated, which may be the case for a wind turbine that is newly installed, or a wind turbine to which the control function is being retrofitted. The LUE based control function is activated, or commissioned, at step 401, but before it is enabled, such that it provides control signals to the wind turbine, the control function enters a bypass mode at step 405.

In the bypass mode, the control function is still active, but is prevented from generating and/or providing control signals to the wind turbine. The controller obtains one or more signals, or values of variables, that indicate the fatigue lifetime of one or more of the wind turbine's components from turbine sensors at step 406. The signals may be processed after being received, if required, to obtain variables to which fatigue lifetime usage algorithms can be applied. At step 407 a fatigue lifetime usage algorithm is applied to the signals or variables to determine a measure of the fatigue life consumed by each of a plurality of turbine components. Initial values of the fatigue life may be provided, and these initial values are used to determine the change in fatigue life based on sensor data. For example, if the total fatigue life is 20 years, this may be set as the initial value for fatigue life and the fatigue lifetime consumption expressed as an amount of expected lifetime remaining. Alternatively the initial fatigue life may be set to zero, with the fatigue lifetime consumption being expressed as an amount of fatigue life consumed.

The initial fatigue life value for the LUEs will depend upon whether the control function is being implemented at the time of turbine commissioning, or is being retrofitted. If the control function is being activated at turbine commissioning, then the initial fatigue life consumed can be set to zero, or alternatively the fatigue life remaining can be set to the wind turbine target lifetime. Alternatively, if the control function is being retrofitted to an existing turbine then the initial fatigue life consumed, or fatigue life remaining, could be set in one of three ways. Firstly, if LUEs have been previously active on the turbine, then these could be used to set the fatigue life at initialisation of the LUE control function. Secondly, local site data such as wind speed and turbulence intensity could be used in conjunction with a turbine siting computer program to estimate the fatigue life at the initialisation time. Thirdly, the expected fatigue life at a given point in time, according to a known function, may be used such as the linear functions shown in FIG. 3. Other methods for determining the initial fatigue life value may be used.

The bypass state of the LUE based control function is maintained for a predetermined amount of time 408 from activation or commissioning of the control function. The intention is to prevent the LUE control function from suppressing power generation during periods of high fatigue damage, above the expected damage curve, that would later be compensated for by periods of lower fatigue damage, below the expected damage curve. The predetermined period of time may be between 1 month and 3 years from commissioning of the LUE control function. Advantageously, the predetermined period may be between 2 months and one year. Preferably the period should be sufficiently long to encompass all seasons in which the rate of accumulation of fatigue damage may exceed the long-term average. On a typical northern hemisphere site, this would be Winter, the first half of Spring and the second half of Autumn, meaning 6 months, or around 6 months, although for some sites this could be up to 9 months. The precise duration depends on the specific site conditions.

During the bypass period, only the LUE control function is overridden. Other control functions, such as protection functions or operational constraints, which limit the possible over-rating set point signal as a function of various operating parameters, will still be active.

After expiry of the bypass period the control function is enabled, and it starts to generate control signals and/or provide them to the wind turbine controller. As indicated at step 407, the fatigue life consumption of the various components are monitored using LUEs throughout the over-ride period, and so the lifetime consumption values used by the control function, upon enablement, can be set to the fatigue lifetime consumption values determined during the over-ride at step 409.

As a specific example a turbine over-rating control function, "Life-Use control" (LUC), may be applied to Life Use Estimates to control the lifetime of the associated components. The control function compares the current estimate of component life used with a target value for life use at the current time in the life of the turbine. The amount of power produced by over-rating the wind turbine is then manipulated to limit the rate of life use (RLU). The actuating signal for the Life Use Control function at any time is the difference between the estimate of component life used and the target value for life use at that time.

The target value for the amount of life use at a given time may be calculated for all components for which life use is being monitored. The target value may be calculated as the elapsed time to date since commissioning of the turbine divided by the target lifetime of the turbine.

A counter in the turbine controller records the elapsed time to date since commissioning of the turbine in a form suitable for use in the lifetime calculations. The target lifetime for the turbine may be a parameter that can be set via a user interface, with default value of anything from 20 to 25 years, for example.

This power demand may be a value from 0% to 100%, where 0% is no over-rating and 100% is maximum permissible over-rating, or may be expressed in units of power, e.g. kilowatts. In other examples, where the controller is used for other control strategies that trade off fatigue damage and power demand, the power demand may instead be an indication of the amount of de-rating to be applied to a turbine.

The output of the Life Use Control function is a power demand signal for each component, such as a signal indicating the percentage of over-rating allowed in view of the Life Use Control function. The output signals may be passed through a low-select function to select the signal, for each of the components, that results in the lowest over-rating power level. Optionally, the output of the low-select function may be applied to one or more further low-select functions that are common with any other over-rating control functions, or other wind turbine controls, that may be implemented within the turbine. The lowest power demand signal is selected and is applied to the wind turbine controller as the wind turbine power demand signal.

In this example, for the first six months of operation after an LUE control function is initialised with a default value of life used based on the time since commissioning the turbine, the LUC control is suspended from reducing the over-rating, in case such initialisation occurs during a high-wind season. This can apply to each LUE, and therefore the associated component, individually.

A delay value "LUCActivationDelay", having the desired value (e.g. 6 months), is added to the value of time during which the turbine has been operational at the time of initialisation and the value is stored in a memory accessible by the controller:

LUCActivationTime_Component= Time$_{from\ commissioning\ turbine}$+LUCActivationDelay This value provides the delay-time (e.g. number of months) before the Life-Use Control (LUC) function can become active following initialisation of the associated component LUE. The delay value may be a factory-set constant.

The LUC associated with a given component will then ensure that it only becomes active when:

$$\text{Time}_{from\ commissioning\ turbine} > \text{'LUCActivationTime\_Component'}$$

In any embodiment, during any period in which the LUE based control function is over-ridden, it is possible for an alternative control function to be executed in its place. For example, in embodiments in which over-rating of the wind turbine is being performed, the over-rating control can be set to provide maximum possible power output, or a predetermined fraction thereof. During the over-ride time, the LUEs for each component are not used to control over-rated output, but they are allowed to run and accumulate data. At the end of the over-ride period, the LUE results can be evaluated and used to determine a maximum power output for a subsequent period of time, e.g. for the next six months or one year.

Non-over-rating applications are also possible, for example where LUEs are otherwise used to control turbine power output or other parameters to maintain the lifetime usage of one or more components within an envelope set by an expected lifetime function. Such control strategies may use LUEs to reduce output power below rated power depending upon accumulated lifetime usage, or rate of accumulation of lifetime usage. If initiated during a high wind season associated with high rate of accumulation of fatigue damage then power output would be unnecessarily suppressed. By initialising the LUEs as described herein unnecessary initial suppression is avoided.

Figure 5:
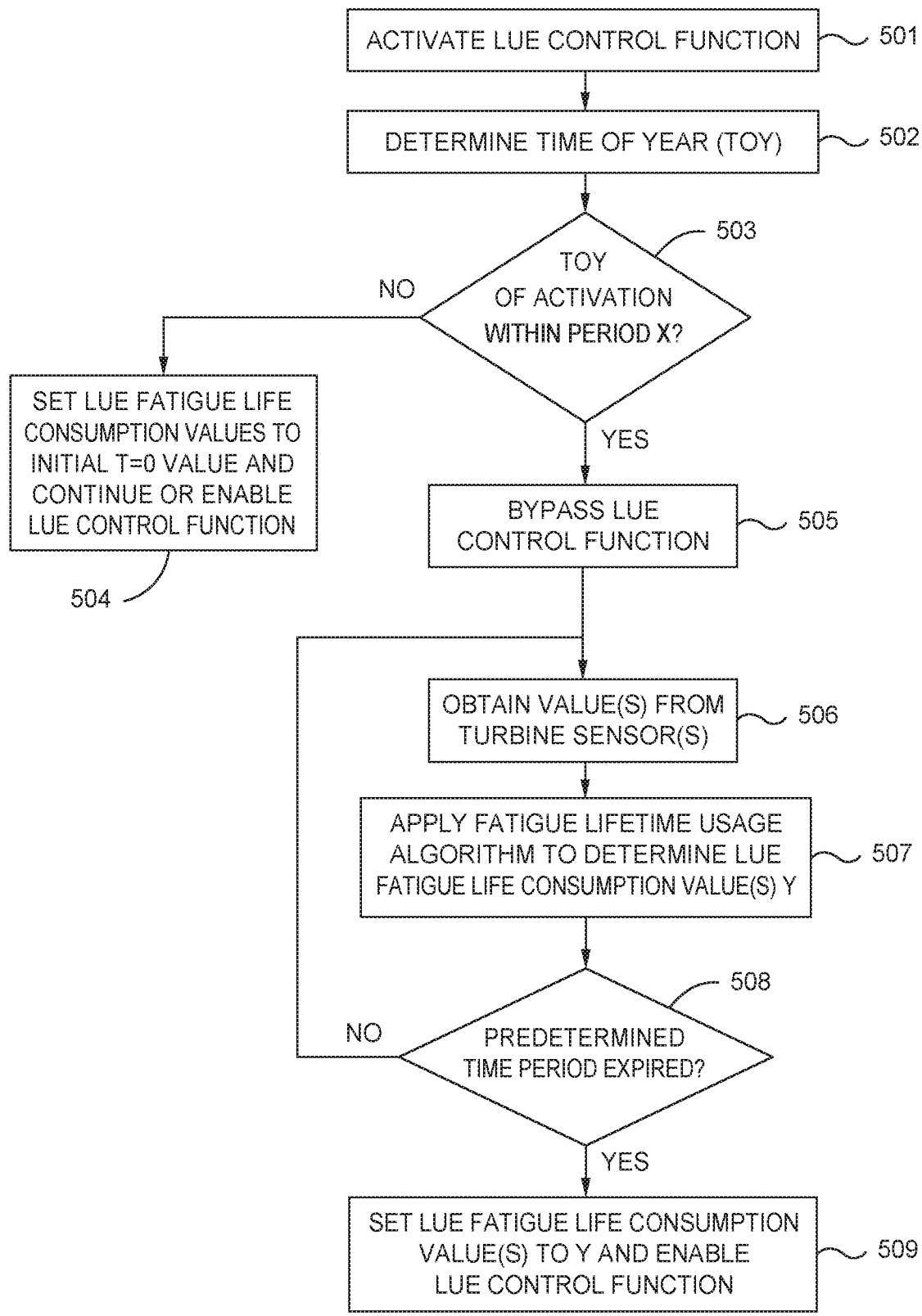
FIG. 5 is a further example of a method employed in a turbine controller to initialise an LUE based control function according to an embodiment of the invention.

FIG. 5 introduces a further optional functionality into the embodiment of FIG. 4, which may be combined with other embodiments. The method of FIG. 5 differs from that of FIG. 4 by virtue of additional steps 502 to 504.

At step 502 a determination is made as to the time of year that the LUE control function has been activated. A determination is then made, at step 503, as to whether the time of year of initialisation falls within a time period X which is a predetermined period of the year, such as October to March. If the time of year of initialisation is within the period X then the bypass functionality described above is implemented. Otherwise, the LUE control function is enabled or continued and is not bypassed.

The predetermined period of the year may correspond to a time of year that historically experiences conditions that increase the rate of accumulation of fatigue life. For example, the time of year may be characterised by high wind speeds and/or turbulence levels. Typically this may correspond to particular seasons such as Winter. If the LUE control function is operated from the time of commissioning the wind turbine, then the predetermined time of year may be selected based upon historical meteorological data for the site on which the wind turbine or wind power plant stands. If the LUE control function is installed some time after the time of commissioning, for example some years after the time of commissioning the turbine, the predetermined time of year may be selected based upon historical operating data for the wind turbine or wind power plant in addition to, or instead of, historical meteorological data for the wind turbine or wind power plant.

The predetermined time period used in step 508 may be chosen such that after it has expired the predetermined period of the year referred to in step 503 has passed. In particular, the predetermined period of time may be selected or calculated such that once it has expired, the season or time of year corresponding to high rate of accumulation of fatigue damage has passed.

The control methods described herein may be implemented directly in a turbine controller. Alternatively, the methods may be implemented in a local site controller, such as a wind power plant controller, where the control function and associated over-ride are applied, individually, to a plurality of wind turbines and the output power demand of the control function is then applied to the individual turbine controllers. Alternatively the methods may be implemented remotely in a similar manner. The methods may, in some embodiments, be implemented as part of an over-rating controller, which controls the amount of power generated above rated power by over-rating the turbine. In other embodiments the controller may be used to control de-rating of a turbine, reducing power below rated power using input from LUEs.

The controllers, functions and logic elements described herein may be implemented as hardware components or software executing on one or more processors located at the wind turbines, the PPC or a remote location, or a combination thereof.

It should be noted that embodiments of the invention may be applied to both constant-speed and variable-speed turbines. The turbine may employ active pitch control, whereby power limitation above rated wind speed is achieved by feathering, which involves rotating all or part of each blade to reduce the angle of attack. Alternatively, the turbine may employ active stall control, which achieves power limitation above rated wind speed by pitching the blades into stall, in the opposite direction of that used in active pitch control.

Lifetime Usage Estimators

The lifetime usage estimators will now be described in more detail.

The algorithm required to estimate lifetime usage will vary from component to component and the LUEs may comprise a library of LUE algorithms including some or all of the following: load duration, load revolution distribution, rainflow counting, stress cycle damage, temperature cycle damage, generator thermal reaction rate, transformer thermal reaction rate and bearing wear. Additionally other algorithms may be used. As mentioned above, lifetime usage estimation may only be used for selected key components and the use of a library of algorithms enables a new component to be selected for LUE and the suitable algorithm selected from the library and specific parameters set for that component part.

In one embodiment, LUEs are implemented for all major components of the turbine including the blade structure, the blade bearings and bolts, the blade pitch system, the main shaft and bearing system, the gearbox (including gear-tooth contact point, gearbox gear-tooth root bending and/or gearbox bearings), the generator (including windings, bearings and/or terminal box cables), the converter, the transformer (including transformer windings), the yaw system, the tower and the foundation. Alternatively a selection of one or more of these LUEs may be made.

As examples of the appropriate algorithms, rainflow counting may be used in the blade structure, blade bolts, pitch system, main shaft system, converter, yaw system, tower and foundation estimators. In the blade structure algorithm, the rainflow count is applied to the blade root bending flapwise and edgewise moment to identify the stress cycle range and mean values and the output is sent to the stress cycle damage algorithm. For the blade bolts, the rainflow count is applied to the bolt bending moment to identify stress cycle range and mean values and the output sent to the stress cycle damage algorithm. In the pitch system, main shaft system, tower and foundation estimators the rainflow counting algorithm is also applied to identify the stress cycle range and mean values and the output sent to the stress cycle damage algorithm. The parameters to which the rainflow algorithm is applied may include:

Pitch system—pitch force;
Main shaft system—main shaft torque;
Tower—tower stress;
Foundation—foundation stress.

In the yaw system the rainflow algorithm is applied to the tower top torsion to identify the load duration and this output is sent to the stress cycle damage algorithm. In the converter, generator power and RPM is used to infer the temperature and rainflow counting is used on this temperature to identify the temperature cycle and mean values.

Lifetime usage in the blade bearings may be monitored either by inputting blade flapwise load and pitch velocity as inputs to the load duration algorithm or to a bearing wear algorithm. For the gearbox, the load revolution duration is applied to the main shaft torque to calculate the lifetime used. For the generator, generator RPM is used to infer generator temperature which is used as an input to the thermal reaction rate generator algorithm. For the transformer, the transformer temperature is inferred from the power and ambient temperature to provide an input to the transformer thermal reaction rate algorithm.

Where possible it is preferred to use existing sensors to provide the inputs on which the algorithms operate. Thus, for example, it is common for wind turbines to measure directly the blade root bending edgewise and flapwise moment required for the blade structure, blade bearing and blade bolts estimators. For the pitch system, the pressure in a first chamber of the cylinder may be measured and the pressure in a second chamber inferred, enabling pitch force to be calculated. These are examples only and other parameters required as inputs may be measured directly or inferred from other available sensor outputs. For some parameters, it may be advantageous to use additional sensors if a value cannot be inferred with sufficient accuracy. The time step for sampling the LUE parameters, $\Delta T_{LUEn}$, may be typically from 10 ms up to 4 seconds.

The algorithms used for the various types of fatigue estimation are known and may be found in the following standards and texts:

Load Revolution Distribution and Load Duration:
  Guidelines for the Certification of Wind Turbines, Germainischer Lloyd, Section 7.4.3.2 Fatigue Loads
Rainflow:
  IEC 61400-1 'Wind turbines—Part 1: Design requirements, Annex G
Miners Summation:
  IEC 61400-1 'Wind turbines—Part 1: Design requirements, Annex G
Power Law (Chemical Decay):
  IEC 60076-12 'Power Transformers—Part 12: Loading guide for dry-type power transformers', Section 5.

The invention claimed is:

1. A method of controlling a wind turbine, the method comprising:
  initializing a control function that controls power production by the wind turbine based on measures of fatigue life consumption of one or more turbine components;
  initially over-riding the initialized control function for a predetermined period of time, such that the power production by the wind turbine is not altered based upon the measures of fatigue life consumption;
  during the predetermined period of time, operating one or more fatigue lifetime usage estimation algorithms to determine a measure of the fatigue life consumed by each of the one or more turbine components; and
  after the predetermined period of time has elapsed, activating the control function and using, in the control function, at least one of the measures of fatigue life consumption determined during the predetermined period of time.

2. The method according to claim 1 wherein the control function controls the power level to which the wind turbine is over-rated.

3. The method according to claim 2, wherein the control function:
  compares the proportion of the fatigue life consumed by the components with a target consumption based on the age of the component; and
  prevents over-rating, or reduces the power level to which the wind turbine is over-rated, if the fatigue life consumed by any component is greater than the target consumption for that component.

4. The method according to claim 2, wherein the control function:
  compares the proportion of the fatigue life consumed by the most damaged component with a target consumption based on the age of that component; and
  prevents over-rating, or reduces the power level to which the wind turbine is over-rated, if the fatigue life consumed is greater than the target consumption for that component.

5. The method according to claim 2, wherein the measures of fatigue life consumption are rates of consumption of fatigue life.

6. The method according to claim 5, wherein the control function applies a predetermined function, to one or more of the rates of consumption of fatigue life, that controls the over-rating amount in proportion to the rate of consumption of fatigue life for each of the one or more turbine components.

7. The method according to claim 2, wherein, during the predetermined period of time, the output power level from the over-ridden control function is set equal to a predetermined over-rating power level.

8. The method according to claim 7, wherein the predetermined over-rating power level is a maximum permissible over-rating for the wind turbine.

9. The method according to claim 2, wherein, during the predetermined period of time, over-rating of the turbine is prevented.

10. The method according to claim 2, wherein the predetermined period of time extends through at least a portion of a seasonal period during which accumulated fatigue damage, or the rate of accumulation of fatigue damage, historically exceeds a target value for a given component.

11. The method according to claim 2, further comprising:
  receiving an input indicative of the time of year at which the control function is being initialized;
  determining whether the time of year falls within a predetermined seasonal period of the year that includes a period during which accumulated fatigue damage, or the rate of accumulation of fatigue damage, historically exceeds a target consumption; and setting the predetermined period of time, during which the control function is over-ridden, based upon the determination.

12. The method according to claim 11, wherein initializing the control function is performed only if the time of year of is within the predetermined seasonal period of the year.

13. The method according to claim 11, wherein the predetermined period of time during which the control function is over-ridden is set as the difference between the time of year and the end of the predetermined seasonal period of the year.

14. The method according to claim 1 wherein the predetermined period of time, during which the control function is over-ridden, is between one month and three years from initializing the control function.

15. The method according to claim 14, wherein the period of time, during which the control function is over-ridden, is between two months and one year from initializing the control function.

16. The method according to claim 15, wherein the period of time, during which the control function is over-ridden, is approximately six months from initializing the control function.

17. The method according to claim 1, wherein the control function is initialized at the time of commissioning the wind turbine.

18. The method according to claim 1, wherein the control function is initialized after commissioning the wind turbine, as a retrofit.

19. The method according to claim 1 wherein the wind turbine is an active stall turbine.

20. A controller for a wind turbine, the controller comprising:
one or more processors configured to:
initialize a control function that controls power production by the wind turbine based upon measures of fatigue life consumption of one or more turbine components;
initially over-ride the initialized control function for a predetermined period of time, such that the power production by the wind turbine is not altered based upon the measures of fatigue life consumption;
during the predetermined period of time, operate one or more fatigue lifetime usage estimation algorithms to determine a measure of the fatigue life consumed by each of the one or more turbine components; and
after the predetermined period of time has elapsed, activate the control function and using, in the control function, at least one of the measures of fatigue life consumption determined during the predetermined period of time.

21. A controller for a wind power plant, the controller comprising:
one or more processors configured to, for each wind turbine of a plurality of wind turbines:
initialize a control function that controls power production by the wind turbine based upon measures of fatigue life consumption of one or more turbine components of the turbine;
initially over-ride the initialized control function for a predetermined period of time, such that the power production by the wind turbine is not altered based upon the measures of fatigue life consumption;
during the predetermined period of time, operate one or more fatigue lifetime usage estimation algorithms to determine a measure of the fatigue life consumed by each of the one or more turbine components of the wind turbine; and
after the predetermined period of time has elapsed, activate the control function and using, in the control function, at least one of the measures of fatigue life consumption determined during the predetermined period of time.

22. A non-transitory computer readable medium containing code which, when executed by a controller causes the controller to perform an operation for controlling at least one wind turbine, the operation comprising:
initializing a control function that controls power production by the wind turbine based on measures of fatigue life consumption of one or more turbine components;
initially over-riding the initialized control function for a predetermined period of time, such that the power production by the wind turbine is not altered based upon the measures of fatigue life consumption;
during the predetermined period of time, operating one or more fatigue lifetime usage estimation algorithms to determine a measure of the fatigue life consumed by each of the one or more turbine components; and
after the predetermined period of time has elapsed, activating the control function and using, in the control function, at least one of the measures of fatigue life consumption determined during the predetermined period of time.

* * * * *